US012340966B2

(12) United States Patent
Noble et al.

(10) Patent No.: US 12,340,966 B2
(45) Date of Patent: Jun. 24, 2025

(54) FUSE HOLDER

(71) Applicant: Astec International Limited, Kowloon (HK)

(72) Inventors: Austin M. Noble, Eden Prairie, MN (US); Robert H. Kippley, Eden Prairie, MN (US)

(73) Assignee: Astec International Limited, Kowloon (HK)

( * ) Notice: Subject to any disclaimer, the term of this patent is extended or adjusted under 35 U.S.C. 154(b) by 340 days.

(21) Appl. No.: 17/804,028

(22) Filed: May 25, 2022

(65) Prior Publication Data

US 2023/0386776 A1 Nov. 30, 2023

(51) Int. Cl.
*H01R 13/68* (2011.01)
*H01H 85/20* (2006.01)

(52) U.S. Cl.
CPC ...... *H01H 85/205* (2013.01); *H01H 85/2045* (2013.01); *H01H 2085/207* (2013.01); *H01H 2085/2085* (2013.01); *H01H 2085/209* (2013.01)

(58) Field of Classification Search
CPC ............. H01H 85/205; H01H 85/2045; H01H 2085/207; H01H 2085/2085; H01H 2085/209; H01H 85/20; H01H 2085/0412
See application file for complete search history.

(56) References Cited

U.S. PATENT DOCUMENTS 1,537,296 A 5/1925 Gearhart
D257,559 S 11/1980 Myles
4,563,666 A * 1/1986 Borzoni ............. H01H 85/0411 337/201
D298,123 S 10/1988 Beard
4,815,993 A * 3/1989 Falchetti ................ H01H 85/32 439/490
5,167,541 A 12/1992 Alves et al.
(Continued)

FOREIGN PATENT DOCUMENTS

CN 300777680 12/2014
CN 209982826 U 1/2020
(Continued)

OTHER PUBLICATIONS

PDM-AMI4-DDDDC 4 Position Sealed Fuse Holder, Posted Date Mar. 26, 2023 [online], [Retrieved Aug. 24, 2023], Retrieved from internet, https://spemco.com/pdm-ami4-ddddc-4-position-sealed-fuse-holder-water-proof-fuses-included/ (Year: 2023).

*Primary Examiner* — Abdullah A Riyami
*Assistant Examiner* — Nelson R. Burgos-Guntin

(57) ABSTRACT

A fuse holder comprises first and second body halves. The first body half includes a wall having a fuse cavity, a first channel extending from a first end of the fuse cavity of the first body half, and a second channel extending from a second end of the fuse cavity of the first body half. The second body half includes a wall having a fuse cavity, a third channel extending from a first end of the fuse cavity of the second body half, and a fourth channel extending from a second end of the fuse cavity of the second body half. The first channel and the third channel mate together and form a first fuse lead guide path, and the second channel and the fourth channel mate together and form a second fuse lead guide path.

19 Claims, 6 Drawing Sheets

(56) References Cited

U.S. PATENT DOCUMENTS

| | | | | | |
|---|---|---|---|---|---|
| 5,281,171 | A * | 1/1994 | Job | H01H 85/2035 | 439/620.26 |
| 5,621,602 | A * | 4/1997 | Winkelmann | H04M 3/18 | 361/124 |
| D406,569 | S | 3/1999 | Awbrey et al. | | |
| 5,901,045 | A * | 5/1999 | Bencivenga | H05K 1/0256 | 337/248 |
| D442,148 | S | 5/2001 | Renne et al. | | |
| 6,545,861 | B1 * | 4/2003 | Hayes | H02B 1/48 | 174/559 |
| D490,381 | S | 5/2004 | Dejan | | |
| 6,753,754 | B1 * | 6/2004 | Black | H01R 9/245 | 337/214 |
| D525,210 | S | 7/2006 | Disbennett et al. | | |
| 7,942,706 | B1 | 5/2011 | Mcsweyn et al. | | |
| 9,325,122 | B1 | 4/2016 | Goyal | | |
| 10,381,184 | B1 * | 8/2019 | Kuenzie | H01H 85/2045 | |
| 11,270,861 | B1 * | 3/2022 | Johler | H01H 85/165 | |
| D1,034,483 | S * | 7/2024 | Noble | D13/160 | |
| 2008/0184560 | A1 * | 8/2008 | Pizzi | H01H 85/56 | 29/874 |
| 2012/0038450 | A1 * | 2/2012 | Jung | H01H 85/048 | 337/184 |
| 2013/0109236 | A1 | 5/2013 | Von | | |
| 2015/0262775 | A1 * | 9/2015 | Kang | H01H 37/761 | 337/414 |
| 2016/0055987 | A1 | 2/2016 | Brakefield | | |
| 2016/0284501 | A1 | 9/2016 | Zhou et al. | | |
| 2017/0345604 | A1 * | 11/2017 | Shah | H01H 85/203 | |
| 2018/0047539 | A1 * | 2/2018 | Kang | H01H 85/048 | |
| 2018/0323030 | A1 * | 11/2018 | Brakefield | H01H 85/22 | |
| 2019/0214213 | A1 * | 7/2019 | Siegwald | H01H 85/165 | |
| 2021/0098205 | A1 * | 4/2021 | Langer | H01H 47/001 | |
| 2023/0386776 | A1 * | 11/2023 | Noble | H01H 85/2045 | |

FOREIGN PATENT DOCUMENTS

| | | |
|---|---|---|
| CN | 305851180 | 6/2020 |
| CN | 305886663 | 11/2020 |
| CN | 306991917 | 12/2021 |

* cited by examiner

FUSE HOLDER

TECHNICAL FIELD

Aspects of the disclosure relate to electrical components, and more particularly to a container to hold fuses.

BACKGROUND

A power supply unit is an electrical device that supplies electric power to an electrical load. Power supply units typically have a power input connection, which receives energy in the form of electric current from a source, and one or more power output connections that deliver current to the load. The primary function of a power supply is to convert electric current from a source to a correct voltage, current, and frequency to power a load. A power supply unit may perform a variety of functions, such as, but not limited to, power conversion, alternating current to direct current (AC-DC) or DC-DC conversion, adjusting voltage levels, and providing backup power during power grid outages. A power supply system typically includes multiple power sources (or power supply units) that provide power and power management functionality including load current sharing among the multiple power sources.

An increased demand for high power density power supply designs can demand higher power output performance in smaller packages. To meet high power density design requirements, components are physically arranged in tighter and tighter arrangements. As such, board space or real estate can be highly limited.

In addition to the challenge of finding board space in which to place components, time-intensive installation procedures during the manufacturing process may be designed to prevent unintentional interactions between closely-packed components. Some components, such as fuses, may have extra installation steps designed to isolate multiple fuses from each other and from other board components. For example, installation of a fuse in a printed circuit board (PCB) may include placing the body of the fuse in heat shrink tubing and putting sleeving on each of the wires to reduce or minimize interaction of the fuse's electrically conductive surfaces. Other materials such as room-temperature-vulcanizing (RTV) silicone may be further used to maintain the physical placement of the fuse with neighboring components as well.

It would be advantageous to decrease the number of installation steps while reducing the board space footprint for one or more fuses on a PCB.

SUMMARY

In accordance with one aspect of the present disclosure, a fuse holder comprises a first body half and a second body half. The first body half comprises a wall having a fuse cavity formed therein, a first channel formed therein and extending from a first end of the fuse cavity of the first body half, and a second channel formed therein and extending from a second end of the fuse cavity of the first body half. The second body half comprises a wall having a fuse cavity formed therein, a third channel formed therein and extending from a first end of the fuse cavity of the second body half, and a fourth channel formed therein and extending from a second end of the fuse cavity of the second body half. The first channel and the third channel mate together and form a first fuse lead guide path, and the second channel and the fourth channel mate together and form a second fuse lead guide path.

In accordance with another aspect of the present disclosure, a method of assembling a fuse assembly comprises positioning a first fuse in a first fuse cavity of a first body half of a fuse holder and fastening a second body half of the fuse holder to the first body half to form a first support cavity about the first fuse. The first body half comprises a wall has the first fuse cavity formed therein, a first channel extending from the first fuse cavity and configured to form a first fuse lead guide path, the first fuse lead guide path configured to guide a first lead of the first fuse from the first support cavity to a first position extending from the fuse holder. The second channel extends from the first fuse cavity and is configured to form a second fuse lead guide path, the second fuse lead guide path configured to guide a second lead of the first fuse from the first support cavity to a second position extending from the fuse holder. The second body half comprises a wall has a second fuse cavity formed therein configured to receive the first fuse, a third channel extending from the first fuse cavity and configured to mate with the first channel, and a fourth channel extending from the first fuse cavity and configured to mate with the second channel.

BRIEF DESCRIPTION OF THE DRAWINGS

The drawings illustrate embodiments presently contemplated for carrying out the invention.

In the drawings.

Figure 1:
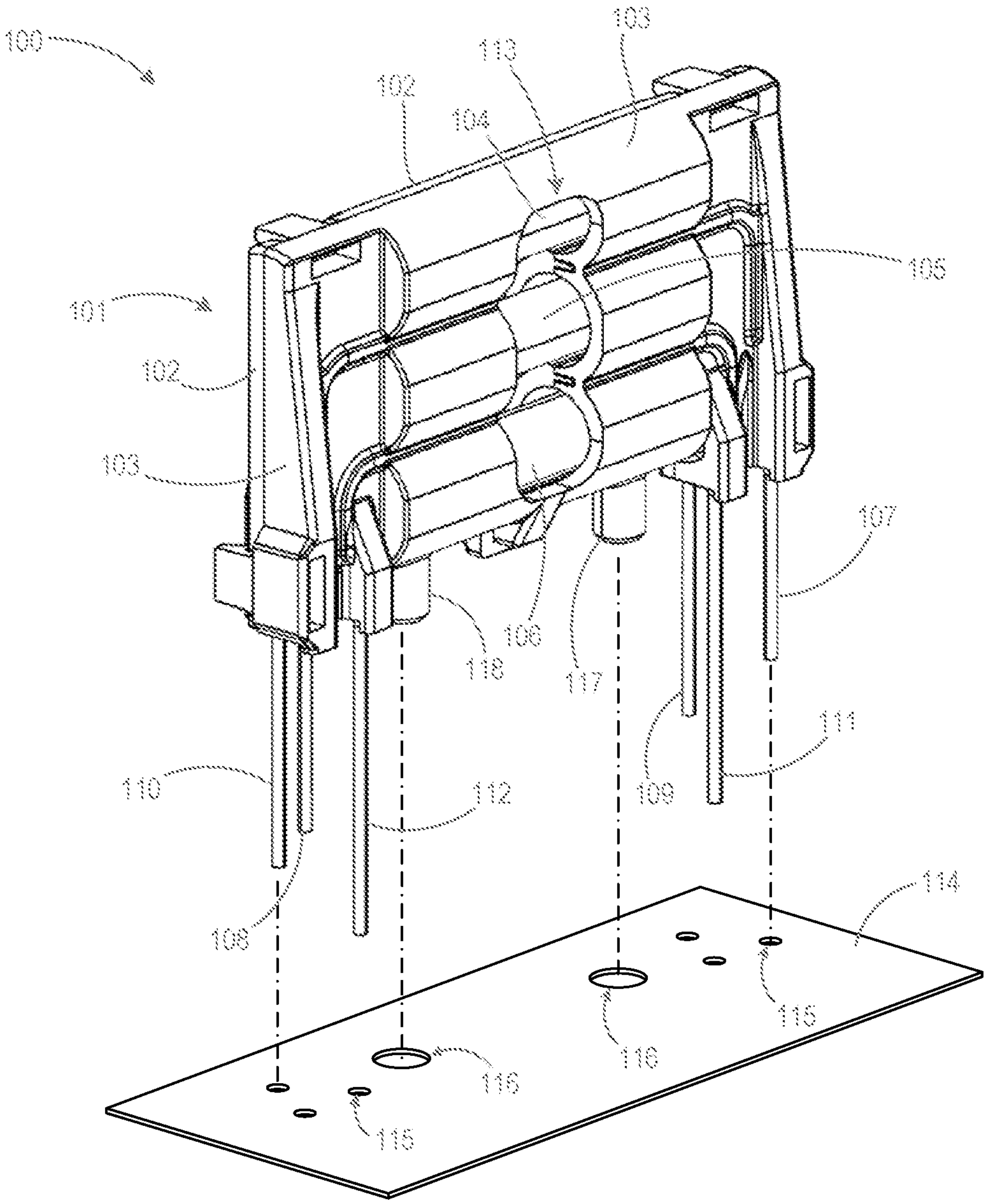
FIG. 1 is an orthogonal view of a fuse assembly in accordance with some embodiments of the present technology.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIG. 1 illustrates a fuse assembly 100 in accordance with some embodiments of the present technology. Fuse assembly 100 includes a fuse holder 101 having a pair of body halves 102, 103 supporting and enclosing a plurality of fuses 104, 105, 106. While fuses may come in a variety of shapes and sizes, the fuse holder 101 illustrated in FIG. 1 is designed to hold cylindrically-shaped axial lead (e.g., pigtail) fuses for PCB footprint reduction and ease of installation. Fuse 104 has leads 107, 108 extending therefrom, fuse 105 has leads 109, 110 extending therefrom, and fuse 106 has leads 111, 112 extending therefrom.

The fuses 104, 105, 106 may be constructed of any of a variety of materials known in the art. For example, the cylindrical body portion of the fuse may be made of glass to allow for visual inspection of the fuse element within the body or be made of other materials such as ceramic, reinforced plastic, and the like. In addition, the interior volume of the fuse may be filled with air, sand, or other non-electrically conductive materials. Typically, a glass body fuse has a lower voltage rating than a ceramic body fuse. The fuse element may be a fast-acting type or a slow-acting type. The speed of action of the fuse of breaking at a desired current value is based on the heat generated as the current flows through the fuse. In some designs, the fuses may be able to withstand a high amount of heat. However, whether or not a high heat is generated in the fuses, a window 113 in one or more of the body halves 102, 103 allows generated heat to be distributed to the environment that can reduce trapped heat within the fuse holder 101 contributing to early or unexpected conduction loss (e.g., electrical disconnection of the internal fuse element from one or more of the fuse ends).

Installing the fuse assembly 100 on a mounting surface such as a PCB 114 includes aligning leads 107-112 with respective through-hole vias 115 in the PCB 114. In addition to the through-hole vias 115 for the leads 107-112, the PCB 114 includes through-hole vias 116 for posts 117, 118 extending from a bottom side of the fuse holder 101. As described herein, a plurality of lead channels directs the bending of the leads 107-112 into alignment positions with their respective vias. It is noted that while the embodiments of the fuse holder 101 illustrated herein include supporting positions for three fuses (e.g., fuses 104-106), other contemplated embodiments include more or less than three fuses. For example, a single fuse holder may be beneficial for directing the bending and positioning of the leads into position for easier installation and may provide electrical isolation from adjacent components without needing extra installation steps otherwise used to isolate the separate leads and affix the fuse body in place.

Figure 2:
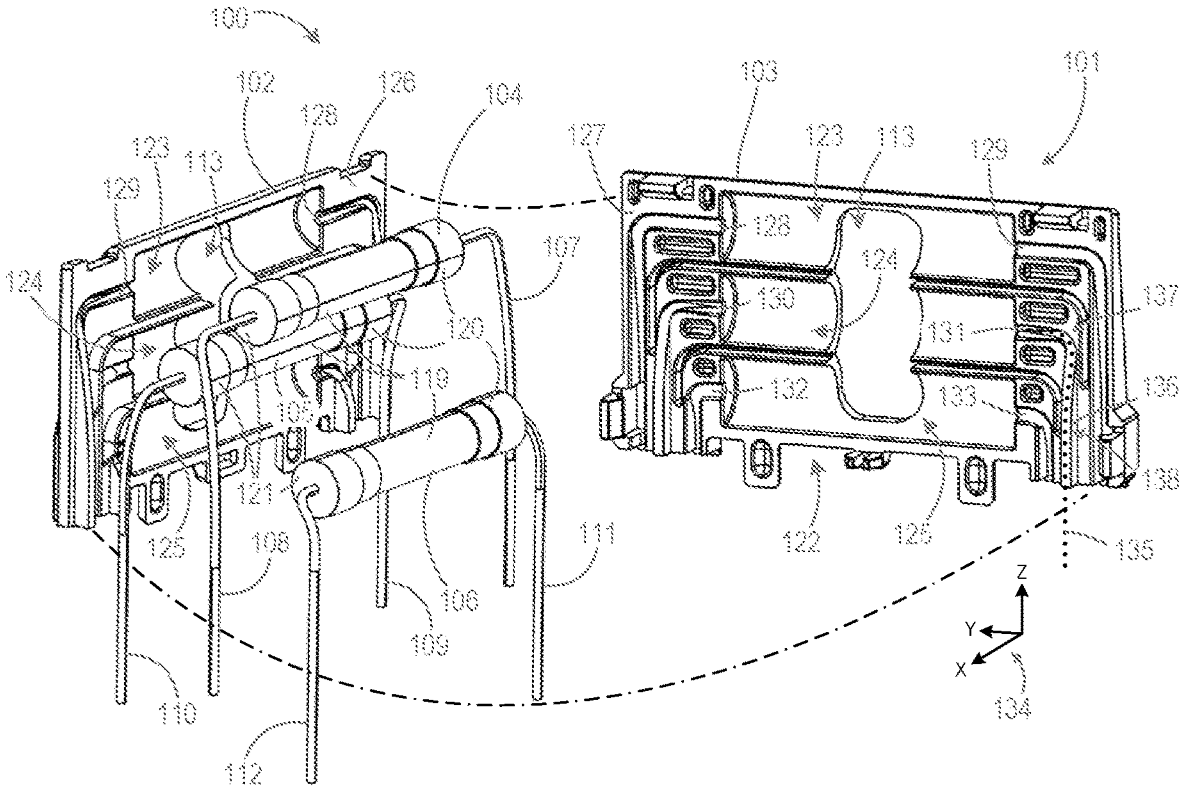
FIG. 2 is an exploded orthogonal view of the fuse assembly of FIG. 1 in accordance with some embodiments of the present technology.

FIG. 2 illustrates an exploded orthogonal view of the fuse assembly 100 in accordance with some embodiments of the present technology. As shown, fuses 104, 105, 106 include fuse bodies 119 capped with end caps 120, 121 from which the axial leads (e.g., leads 111, 112) extend. However, the fuse holder 101 may be designed to house fuses with or without the end caps.

An internal portion or volume 122 of the fuse holder 101 includes a fuse cavity 123, 124, 125 formed in a wall 126, 127 of each body half 102, 103 for each of the fuses 104, 105, 106. When the body halves 102, 103 are closed or fastened together in an abutting relationship, the fuse cavities 123, 124, 125 may form substantially cylindrical spaces or support cavities absent any cutout portion for the window 113. Extending in the wall 126 from a vertically central end portion of each cavity 123-125 in a direction in line with a first portion of the respective leads 107-112 is a channel 128-133 through which the leads 107-112 are guided for alignment with their respective PCB through-hole vias 115. As shown in FIG. 1, the leads 107-112 extend in a vertically downward direction from a bottom of the fuse holder 101. In addition to providing via alignment, the channels 128-133 separate portions of the leads 107-112 from each other in a sideways direction orthogonal to the downward direction.

Figure 3:
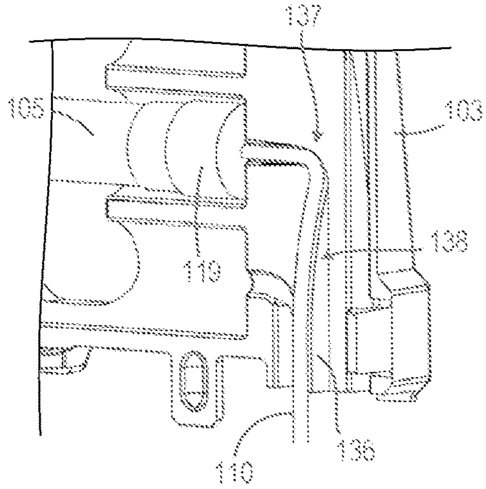
FIG. 3 is an orthogonal view of a fuse positioned within a body half of the fuse holder of FIG. 1 in accordance with some embodiments of the present technology.
Figure 4:
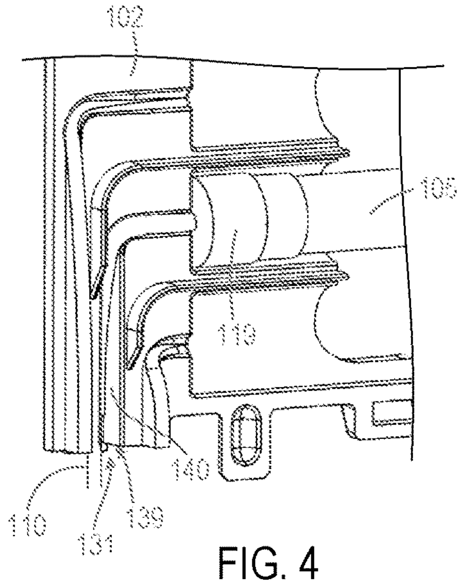
FIG. 4 is an orthogonal view of the fuse of FIG. 3 positioned within the other body half of the fuse holder of FIG. 1 in accordance with some embodiments of the present technology.

For example, referring to a local coordinate axis 134 illustrated in FIG. 2 for the body half 103 and further referring to FIG. 3, channel 131 provides a guide path 135 having an initial portion adjacent to the fuse cavity 124 aligned with the lead 110 as it extends from its end cap 119. A fin or tongue portion 136 of a tongue-and-groove-type arrangement of the channel 131 gradually extends from the body half 103 in a horizontal direction (e.g., a positive X direction) and guides the lead 110 about a curve portion 137 and a tapering extension portion 138 toward a bottom 139 of the channel 131. The lead 110 of the fuse 105 is bent or formed to align with the channel 131. FIG. 4 illustrates the fuse 105 positioned in the other body half 102 with its lead 110 following the contours of the groove portion 140 of the channel 131 that mates with the tongue portion 136 of body half 103. In one embodiment, the lead 110 of the fuse 105 may be pre-bent or pre-formed to follow the contours of the channel 131 prior to its being positioned within the fuse cavity 124 of the body halves 102, 103. In an alternative embodiment, the portion of the lead 110 aligning with the curve portion 137 of the channel 131 may be pre-bent prior to its being positioned within the fuse cavity 124 while the remaining portion of the lead 110 may be bent to follow the contours of the channel 131 as the two body halves 102, 103 are pressed together during assembly. Alternatively, the entire lead 110 may be pre-bent to align with the contours of the channel 131 prior to being positioned thereinto during installation.

Figure 5:
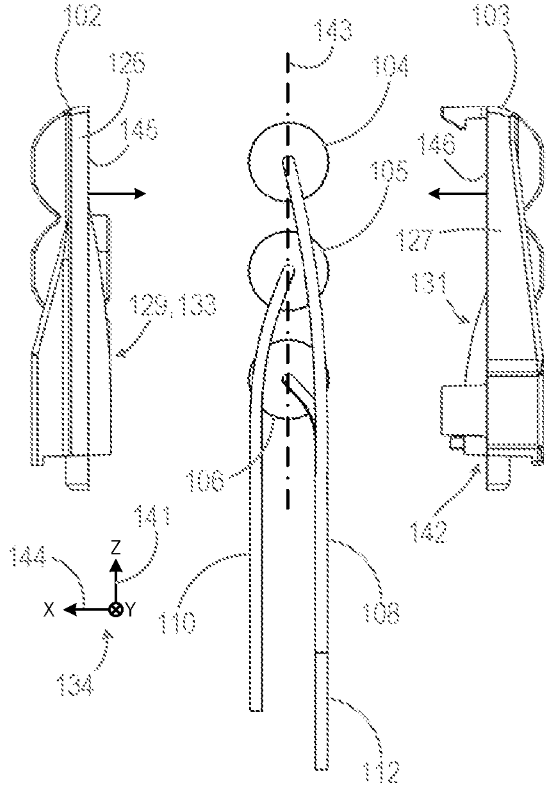
FIG. 5 is an exploded side plan view of the fuse assembly of FIG. 1 in accordance with some embodiments of the present technology.

FIG. 5 is an exploded side plan view of the fuse assembly 100 showing the fuses 104, 105, 106 aligned as they are positioned within the fuse holder 101 when the body halves 102, 103 are fastened together such as illustrated in FIG. 1. The fuse holder 101, in one embodiment, positions and supports the fuses 104, 105, 106 in a parallel alignment along the Z, or vertical, direction 141. As illustrated in this side view, the channels 129, 133 guide leads 108, 112 so that when they extend from the bottom 142 of the fuse holder 101, they are shifted or offset from a central plane 143 in a horizontal direction along the negative X direction 144 (e.g., in a direction normal to an interior surface 145 of the wall 126). In contrast, the channel 131 guides lead 110 so that it extends from the bottom 142 of the fuse holder 101 in a shifted or offset horizontal direction along the positive X direction 144 (e.g., in a direction normal to an interior surface 146 of the wall 127). In this manner, the channel 131 offsets the leads of the fuses in the positive X direction or in the negative X direction in an alternating pattern based on the position of the vertically stacked fuses.

Figure 6:
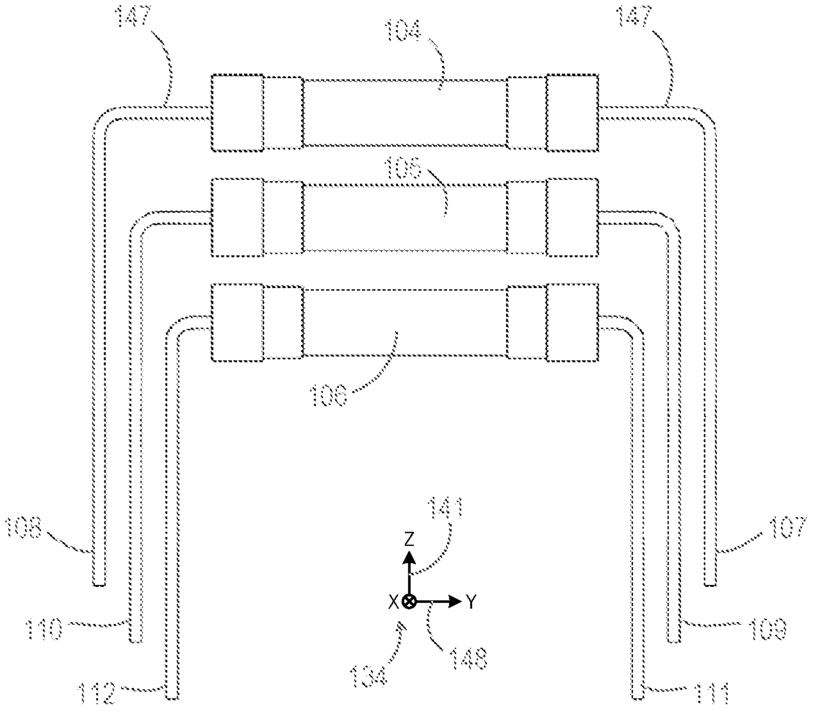
FIG. 6 illustrates the fuses and leads in accordance with some embodiments of the present technology.

FIG. 6 illustrates a view of fuses 104, 105, 106 along the YZ plane. As shown, each lead extends from its respective fuse 104, 105, 106 in an initial straight portion 147 that extends in the positive or negative Y direction 148. At the curve portion of each respective channel 128-133 (e.g., curve portion 137 of channel 131 as shown in FIG. 3 for one of the channels), the lead 107-112 is bent in the downward direction as described above. The separation of the leads 107-112 in the Y and Z directions 148, 141 as shown in FIG. 6 and the X and Z directions 144, 141 as shown in FIG. 5 helps to maintain a lead separation and/or spacing among the lead 107-112 that can satisfy electrical clearance and/or creepage guidelines for the circuit design into which the fuse assembly 100 is used.

Figure 7:
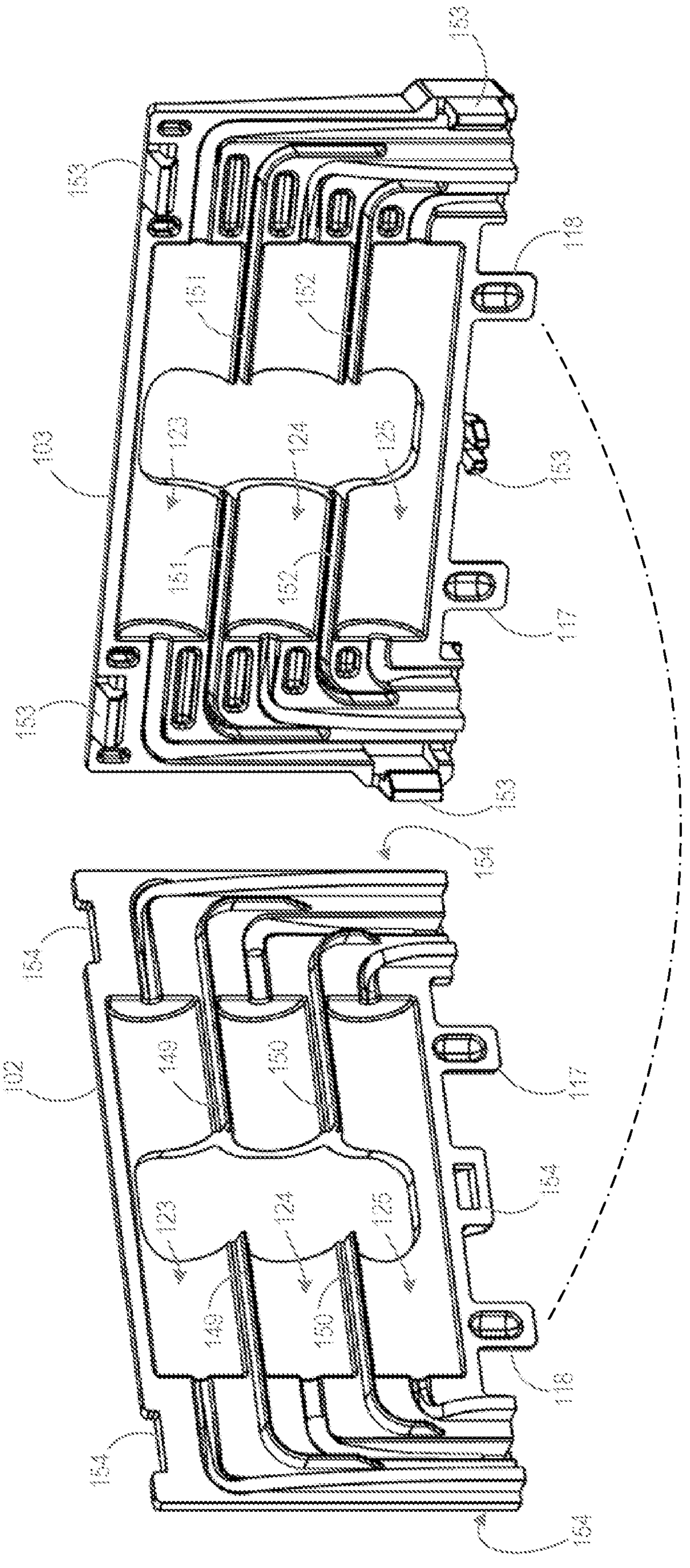
FIG. 7 is an exploded orthogonal view of the fuse holder of the fuse assembly of FIG. 1 in accordance with some embodiments of the present technology.

FIG. 7 illustrates an exploded orthogonal view of the fuse holder 101 without the fuses 104-106. In addition to separating the leads 107-112 in the X, Y, and Z directions 144, 148, 141—as described above, the fuse holder 101 further includes features designed to increase a creepage distance along the inner surfaces between portions of the adjacent fuses 104-106. In one example, body half 102 includes a pair of tongues 149, 150 respectively positioned between fuse cavity 123 and fuse cavity 124 and between fuse cavity 124 and fuse cavity 125. A pair of respective grooves 151, 152 respectively positioned between fuse cavity 123 and fuse cavity 124 and between fuse cavity 124 and fuse cavity 125 of body half 103 mate with the tongues 149-150. With the body halves 102, 103 being constructed of electrically insulative materials, the tongue and groove pairs extend a distance an electrical conduit would need to traverse along the interior walls of the body halves 102, 103 in order to electrically connect adjacent fuses.

FIG. 7 also illustrates fastening members embodied as tabs 153 of body half 103 configured to mate with tab receiving portions 154 of body half 102. It is contemplated, however, that other fastening means other than tabs or in combination with tabs may be used to join the body halves 102, 103 together. In addition, the tabs 153 may be positioned on body half 102 or may be distributed among both body halves 102, 103 according to embodiments.

Figure 8:
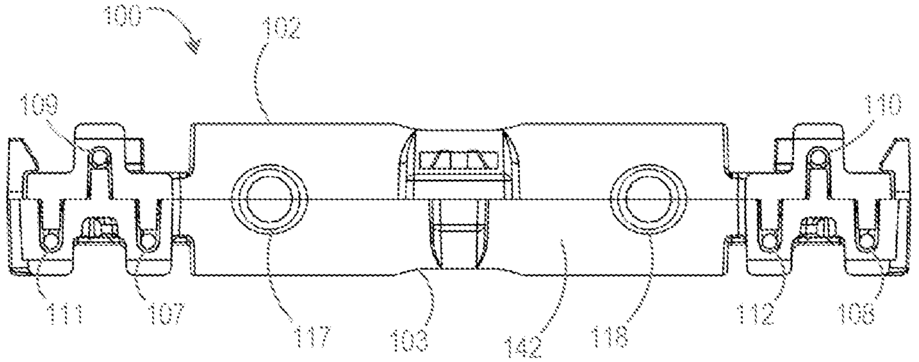
FIG. 8 is a bottom plan view of the fuse assembly of FIG. 1 in accordance with some embodiments of the present technology.

Referring to FIGS. 7 and 8, the posts 117, 118 are illustrated as being formed as half cylinders extending from the bottom 142 of each body half 102, 103. When the body halves 102, 103 are fastened together, the cylinder halves are joined or abutted adjacently to each other to form a full cylindrical post 117, 118 insertable into their respective through-hole vias 116 (see FIGS. 1, 9). While the embodiments of the posts 117, 118 herein are described and shown as cylinders, other shapes are contemplated. In addition, in another embodiment, only one of the body halves 102, 103 may be designed to have a fully-shaped post extending therefrom.

Figure 9:
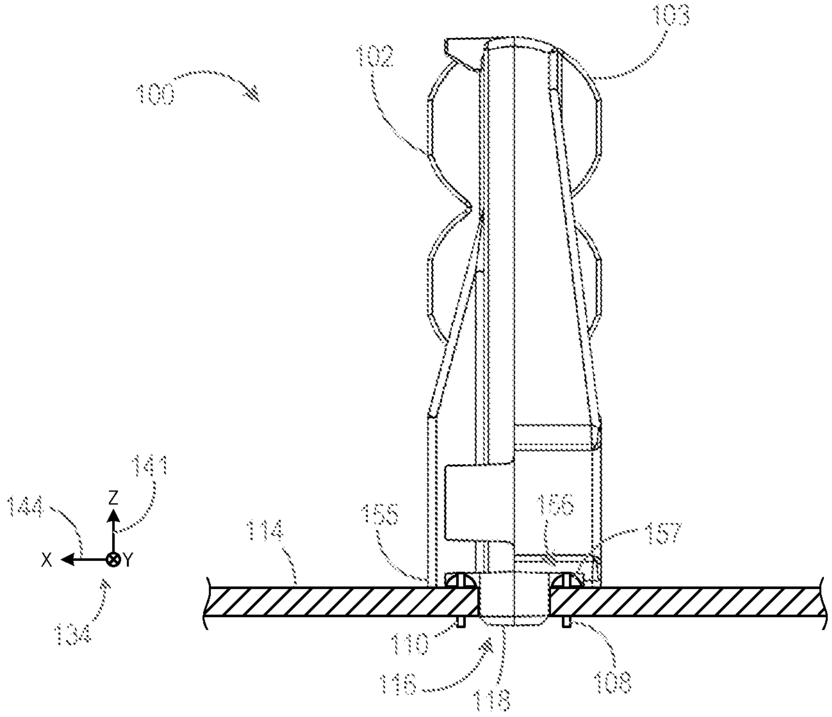
FIG. 9 is a side plan view of the fuse assembly of FIG. 1 installed on a PCB in accordance with some embodiments of the present technology.

FIG. 9 illustrates installation of the fuse assembly 100 in the PCB 114 according to an example. The post 118 extends into and through the through-hole via 116 to provide alignment support that reduces translation or movement of the lead 110 along the XY plane. Each body half 102, 103 may further include standoffs or feet 155 to create a space 156 beneath the fuse holder 101 when positioned adjacently to the PCB 114 to facilitate soldering 157 the leads (e.g., leads 108, 110 as shown) to the PCB 114 within the space 156.

Figure 10:
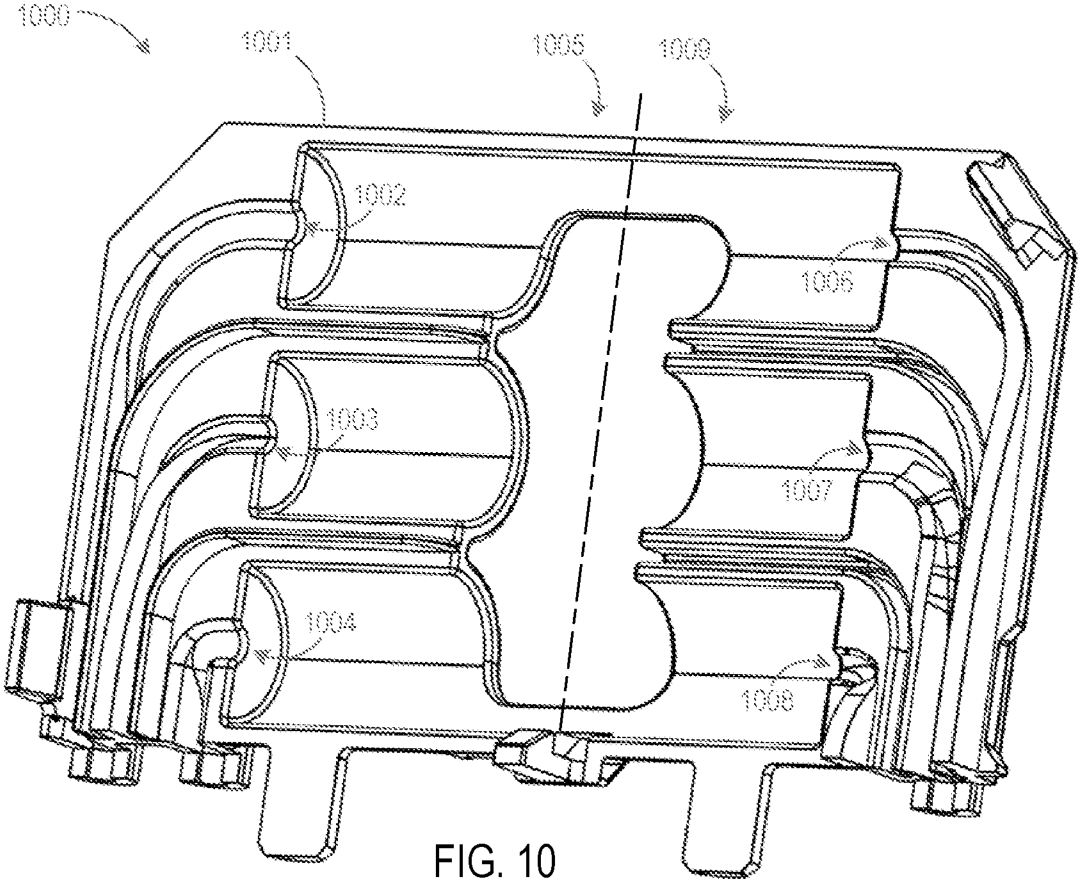
FIG. 10 is a partial orthogonal view of a fuse holder in accordance with some other embodiments of the present technology.

FIG. 10 is a partial orthogonal view of a fuse holder 1000 in accordance with some other embodiments of the present technology. A single body half 1001 of the fuse holder 1000 is illustrated. In this embodiment, two body halves 1001 are identical and may be reversed with respect to each other. Accordingly, the three lead channels 1002, 1003, 1004 the left side 1005 of the body half 1001 form a groove-tongue-groove arrangement while the three lead channels 1006, 1007, 1008 on the right side 1009 form an opposite tongue-groove-tongue arrangement. In this manner, for example, the tongue of the channel 1006 fits within and mates with the groove of the channel 1002. The positioning of fuses and their leads within the fuse holder 1000 is similar to the embodiments described above. The reversible nature of the body half 1001 allows two of the same body halves 1001 to be fastened together in a complete assembly such that only a single part mold may be needed to manufacture the parts that form a complete holder 1000.

The embodiments described herein provide a fuse holder assembly having a compact geometry that maintains electrical isolation between the adjacently positioned fuses. The fuse holder assembly eases installation by aligning fuse leads and reducing the number of parts and installation steps needed during manufacturing of an electrical component such as a power supply unit. Furthermore, repeatability is enhanced in such a mechanically stable package assembly that also offers a small board space design to reduce its real estate footprint on the PCB.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A fuse holder comprising:

a first body half comprising a wall having:

a fuse cavity formed therein, the fuse cavity of the first body half forming a first portion of a cavity for a single fuse;

a first channel formed therein and extending from a first end of the fuse cavity of the first body half, the first channel forming a first portion of a first fuse lead guide path;

a second channel formed therein and extending from a second end of the fuse cavity of the first body half, the second channel forming a first portion of a second fuse lead guide path; and a second body half comprising a wall having:

a fuse cavity for the single fuse formed therein, the fuse cavity of the second body half forming a second portion of the cavity for the single fuse;

a third channel formed therein and extending from a first end of the fuse cavity of the second body half, the third channel forming a second portion of the first fuse lead guide path;

a fourth channel formed therein and extending from a second end of the fuse cavity of the second body half, the fourth channel forming a second portion of the second fuse lead guide path; and a lead offset portion of the first channel comprising a tongue configured to offset the first fuse lead guide path away from an interior surface of the wall of the first body half in a direction normal to the interior surface of the wall of the first body half;

wherein:

the first channel and the third channel mate together and form the first fuse lead guide path;

the second channel and the fourth channel mate together and form the second fuse lead guide path; and the third channel has a groove formed therein configured to receive the tongue.

2. The fuse holder of claim 1, wherein:

the first channel further comprises a curve portion configured to deviate the first fuse lead guide path toward a bottom of the first body half; and the lead offset portion extends between the curve portion and the bottom.

3. The fuse holder of claim 2 further comprising a plurality of standoffs extending from the bottom and configured to create a space between the bottom and a mounting surface abutting the plurality of standoffs.

4. The fuse holder of claim 3, wherein the mounting surface comprises a printed circuit board.

5. The fuse holder of claim 1, wherein the fuse cavity of the first body half and the fuse cavity of the second body half form a first support cavity configured to surround at least a portion of a first fuse positioned therein with the first and second body halves fastened together in an abutting relationship.

6. The fuse holder of claim 5, wherein each of the first and second body halves further has second and third fuse cavities formed therein that form second and third support cavities configured to receive respective fuses therein with the first and second body halves fastened together in the abutting relationship.

7. The fuse holder of claim 6, wherein:

the first body half further comprises:

a first tongue portion extending from the interior surface of the wall of the first body half between the first fuse cavity and the second fuse cavity; and a second tongue portion extending from the interior surface of the wall of the first body half between the second fuse cavity and the third fuse cavity;

the second body half further comprises:

a first groove portion extending into the interior surface of the wall of the second body half between the first fuse cavity and the second fuse cavity; and a second groove portion extending from the interior surface of the wall of the second body half between the second fuse cavity and the third fuse cavity;

the first groove portion is configured to mate with and receive the first tongue portion; and the second groove portion is configured to mate with and receive the second tongue portion.

8. The fuse holder of claim 5, wherein one of the first body half and the second body half comprises a fastener tab extending therefrom and configured to mate with a corresponding tab receiving portion formed in the other of the first body half and the second body half with the first and second body halves fastened together in the abutting relationship.

9. The fuse holder of claim 1, wherein:

a lead offset portion of the fourth channel comprises a tongue configured to offset the second fuse lead guide path away from the interior surface of the wall of the second body half in a direction normal to the interior surface of the wall of the second body half; and the second channel has a groove formed therein configured to receive the tongue of the fourth channel.

10. The fuse holder of claim 1, wherein the first and second body halves are identical to each other.

11. A method of assembling a fuse assembly comprising:

positioning a first fuse in a first fuse cavity of a first body half of a fuse holder, the first fuse cavity forming a first portion of a single fuse cavity; and fastening a second body half of the fuse holder to the first body half to form a first support cavity about the first fuse;

wherein the first body half comprises a wall having:

the first fuse cavity formed therein;

a first channel extending from the first fuse cavity and configured to form a first portion of a first fuse lead guide path, the first fuse lead guide path configured to guide a first lead of the first fuse from the first support cavity to a first position extending from the fuse holder; and a second channel extending from the first fuse cavity and configured to form a first portion of a second fuse lead guide path, the second fuse lead guide path configured to guide a second lead of the first fuse from the first support cavity to a second position extending from the fuse holder; and wherein the second body half comprises a wall having:

a second fuse cavity formed therein configured to receive the first fuse, the second fuse cavity forming a second portion of the single fuse cavity;

a third channel extending from the first fuse cavity and configured to mate with the first channel, the third channel forming a second portion of the first fuse lead guide path; and a fourth channel extending from the first fuse cavity and configured to mate with the second channel, the fourth channel forming a second portion of the second fuse lead guide path; and further comprising:

bending the first lead to follow one or more contours of the first fuse lead guide path; and bending the second lead to follow one or more contours of the second fuse lead guide path via the fastening of the second body half to the first body half.

12. The method of claim 11, wherein fastening the second body half to the first body half comprises engaging a fastening tab of the first body half with a tab receiving portion of the second body half.

13. The method of claim 11, wherein bending the first lead comprises bending the first lead prior to fastening the second body half to the first body half, and wherein bending the second lead comprises bending the second lead prior to fastening the second body half to the first body half.

14. The method of claim 11, wherein bending the first lead comprises bending the first lead via the fastening of the second body half to the first body half; and wherein bending the second lead comprises bending the second lead via the fastening of the second body half to the first body half.

15. The method of claim 14 further comprising:

forming a first curved portion in the first lead prior to bending the first lead to follow the one or more contours of the first fuse lead guide path via the fastening of the second body half to the first body half; and forming a second curved portion in the second lead prior to bending the second lead to follow the one or more contours of the second fuse lead guide path via the fastening of the second body half to the first body half.

16. The method of claim 11, wherein the wall of the first body half further has second and third fuse cavities formed therein;

wherein the wall of the second body half further has second and third fuse cavities formed therein; and wherein the method further comprises:

positioning a second fuse in the second fuse cavity of one of the first and second body halves, the second fuse comprising first and second leads;

positioning a third fuse in the third fuse cavity of one of the first and second body halves, the third fuse comprising first and second leads; and forming second and third support cavities via the respective second and third fuse cavities of the first and second body halves.

17. The method of claim 16, wherein the first, second, and third fuses are in parallel and aligned along a plane.

18. The method of claim 17, wherein the first and second leads of the first fuse and the first and second leads of the third fuse extend from a bottom of the fuse holder at a first distance from a first side of the plane; and wherein the first and second leads of the second fuse extend from a bottom of the fuse holder at a second distance from a second side of the plane opposite the first side of the plane.

19. A method of assembling a fuse assembly comprising:

positioning a first fuse in a first fuse cavity of a first body half of a fuse holder, the first fuse cavity forming a first portion of a single fuse cavity; and fastening a second body half of the fuse holder to the first body half to form a first support cavity about the first fuse;

wherein the first body half comprises a wall having:

the first fuse cavity formed therein;

a first channel extending from the first fuse cavity and configured to form a first portion of a first fuse lead guide path, the first fuse lead guide path configured to guide a first lead of the first fuse from the first support cavity to a first position extending from the fuse holder; and a second channel extending from the first fuse cavity and configured to form a first portion of a second fuse lead guide path, the second fuse lead guide path configured to guide a second lead of the first fuse from the first support cavity to a second position extending from the fuse holder; and wherein the second body half comprises a wall having:

a second fuse cavity formed therein configured to receive the first fuse, the second fuse cavity forming a second portion of the single fuse cavity;

a third channel extending from the first fuse cavity and configured to mate with the first channel, the third channel forming a second portion of the first fuse lead guide path; and a fourth channel extending from the first fuse cavity and configured to mate with the second channel, the fourth channel forming a second portion of the second fuse lead guide path;

wherein the wall of the first body half further has second and third fuse cavities formed therein;

wherein the wall of the second body half further has second and third fuse cavities formed therein; and wherein the method further comprises:

positioning a second fuse in the second fuse cavity of one of the first and second body halves, the second fuse comprising first and second leads;

positioning a third fuse in the third fuse cavity of one of the first and second body halves, the third fuse comprising first and second leads; and forming second and third support cavities via the respective second and third fuse cavities of the first and second body halves.

* * * * *